H. E. PILGRIM.
COUSHION FORK.
APPLICATION FILED MAR. 9, 1910.
989,638.
Patented Apr. 18, 1911.
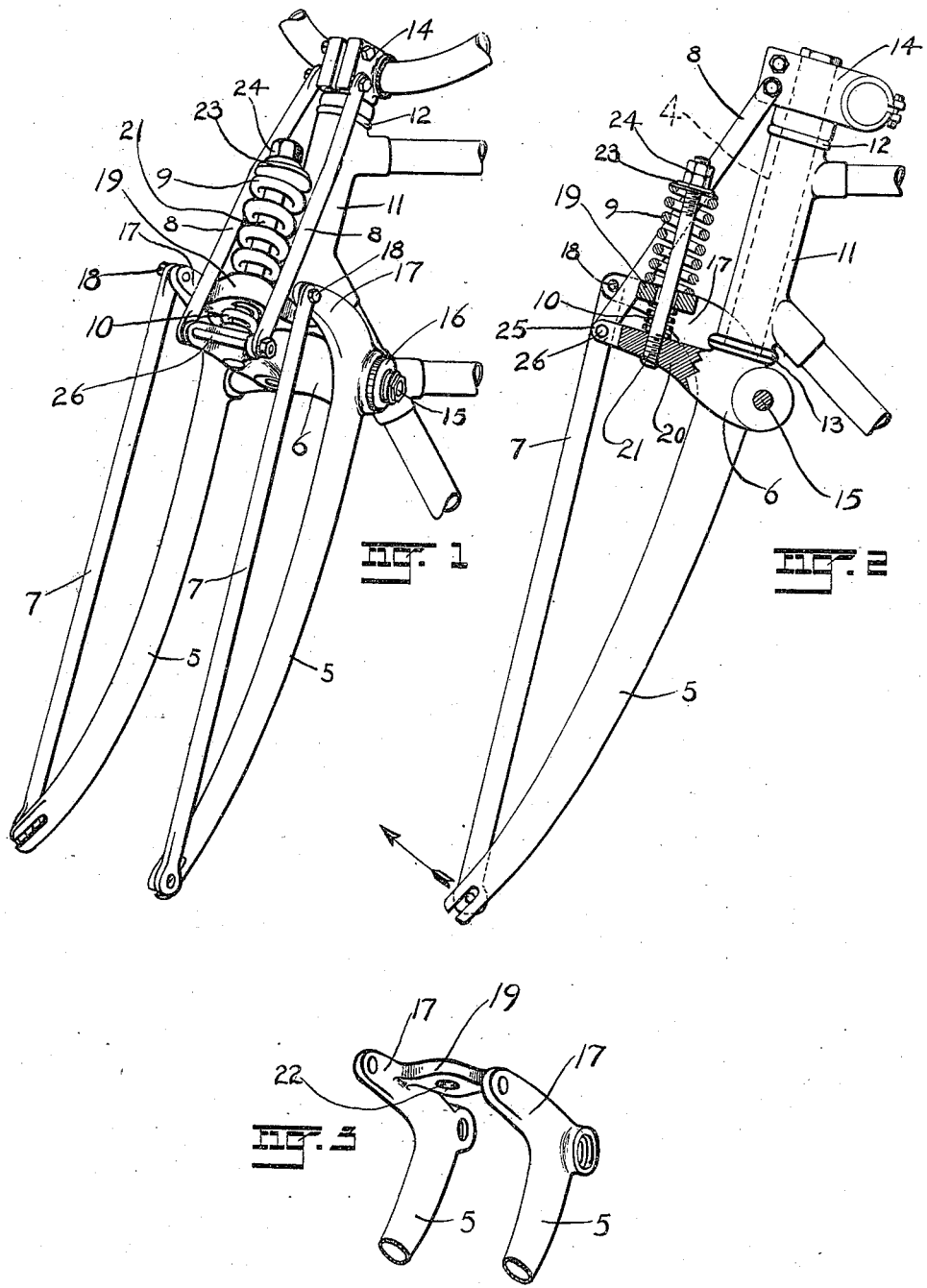

UNITED STATES PATENT OFFICE.

HENRY E. PILGRIM, OF HAMILTON, OHIO.

CUSHION-FORK.

989,638.  Specification of Letters Patent.  Patented Apr. 18, 1911.

Application filed March 9, 1910. Serial No. 548,292.

*To all whom it may concern:*

Be it known that I, HENRY E. PILGRIM, a citizen of the United States of America, and resident of Hamilton, county of Butler, and State of Ohio, have invented certain new and useful Improvements in Cushion-Forks, of which the following is a specification.

This invention relates to bicycles and motorcycles and has for an object to produce a new and improved cushion fork for such machines, which is stronger than existing cushion forks known to me, and which strengthens or reinforces the frame of the machine.

A further object is the production of a cushion fork in which means are employed for eliminating objectionable cross-bending strains.

These and other objects I attain by means of the apparatus illustrated in the drawings accompanying this application and forming a part thereof.

In the drawings: Figure 1 is a perspective view of a fork embodying my invention, shown in connection with a portion of a motorcycle frame. Fig. 2 is a partial section and partial elevation of the fork shown in Fig. 1. Fig. 3 is a perspective view of a portion of the apparatus shown in Figs. 1 and 2.

The fork illustrated as embodying my invention, consists of a stem 4, prongs 5, pivotally mounted on a standard or crown 6, secured to the stem, reinforcing or truss members 7 and 8 for the prongs of the fork and the stem respectively, and springs 9 and 10, which form a spring connection between the crown and the prongs or fork proper. The stem 4 is tubular in shape and extends upwardly through the head 11 of the cycle frame, and is mounted in ball bearings 12 and 13, one of which is located at each end of the head. A combination head and handle bar clamp 14 is secured to the upper end of the stem 4, and holds the stem in place in its bearings.

The standard or fork crown 6 is secured to the stem in the usual manner, and is located immediately adjacent to the lower ball bearing 13. The prongs 5 of the fork proper are pivotally mounted on the pin 15, which extends transversely through the crown 6. A ball bearing 16 is located between each prong 5 and the pin 15.

A forwardly projecting arm 17 is provided on each prong 5, and a reinforcing or truss bar 7 extends from the forward tip of the arm to the tip of the prong. The upper end of each bar is removably secured to its respective arm 17, by any suitable means, such as a bolt 18, and the lower end is adapted to be secured in place on the axle of the wheel, carried by the fork. The two prongs 5 are secured together by means of a spring plate 19, which is located between the arms 17, and which may be formed integral with the arms. The crown plate 20 projects forwardly between the prongs 5, below the spring plate 19, and is preferably formed integral with the fork crown 6. A bolt 21 is mounted on the plate 20, and extends upwardly through an opening 22 provided in the spring plate 19. This opening 22 is sufficiently large to permit the fork proper or the prongs 5 to turn about the pin 15 a limited amount. The coil spring 9 surrounds the bolt 21 and is located between the spring plate 19 and the spring block 23, which is held in place on the bolt by means of an adjusting nut 24. The recoil spring 10 also surrounds the bolt 21, but is located below the spring plate 19 and between it and the crown plate 20.

The reinforcing members or truss bars 8 extend from lugs 25, formed on the forward edge of the plate 20 and the head clamp 14. The lower ends of these bars are secured in place by a bolt 26, which extends through the lugs 25, and the upper ends of the bars are removably secured to the clamp 14 by a suitable bolt. The force of a shock on the cycle wheel, carried by the fork, tends to turn the fork proper or the prongs around the mounting pin 15, in the direction of the arrow shown in Fig. 2. This motion is, however, resisted by the compression spring 9, which is thrown into compression and which transmits the turning force to the crown plate 20, through the bolt 21. The recoil of the spring 9 is resisted by the steadying spring 10, so that the fork is cushioned for both its up and down motion around the pin 15.

By employing the reinforcing members 7 and 8, I almost entirely eliminate cross-bending strains from the fork, and also from the head 11 of the frame. If the bars 7 and 8 were removed, it is apparent that the weight of the rider and the shocks transmitted to the wheel, carried by the fork, would cause cross-bending strains throughout the length of each prong 5, which would reach a maximum at the junction of the prong with the crown. These cross-bending strains would be transmitted by the crown to the stem, and to some extent would be transmitted by the stem to the head 11.

By employing the truss members 7, I eliminate the objectionable cross-bending strains from the prongs, so that practically the only force transmitted by the fork to the head is a thrust parallel in the direction to the stem 4. The turning force transmitted by the spring 9 and the bolt 21 to the crown plate 20, would create an objectionable cross-bending strain at the juncture between the crown 6 and the stem 4, if the truss members 8 were not employed. With these members the turning force transmitted to the plate 20 is distributed throughout the stem 4, by being transmitted to the stem, through both the plate 20 and the truss member 8. The truss members 8 are thrown into compression by this force, and, consequently, the only resultant of the turning force transmitted to the stem by the plate and the crown, is a force parallel in direction to the axis of the stem.

With my invention, lighter forks may be employed and the strains throughout the fork and throughout the frame of the machine are more equally distributed.

The tension of both the springs 9 and 10 may be adjusted by the nut 24, for the purpose of varying the stiffness of the cushion fork.

What I claim is:

1. A fork for bicycles comprising a stem, a crown secured to the stem, a fork pivotally mounted on the crown, a plate secured to said fork, a reinforcing member extending from the crown to the top of the stem, and a spring connection between the crown and the plate.

2. A fork for bicycles comprising a stem, a crown secured to the stem, a fork pivotally mounted on the crown, a spring plate secured to said fork, a crown plate secured to said crown, a reinforcing member extending from said crown plate to the top of the stem, and an adjustable spring connection between said crown plate and said spring plate.

3. A fork for bicycles comprising a stem, a crown secured to the stem, prongs pivotally mounted on the crown, forwardly projecting arms provided on each prong, a spring plate located between the arms of the prongs and securing said prongs together, a reinforcing bar extending from the end of each arm to the tip of the prong on which the arm is mounted, a crown plate provided on said crown, a spring connection between said crown plate and said spring plate, and a reinforcing bar extending from said crown plate to the top of said stem.

HENRY E. PILGRIM.

Witnesses:
B. W. BAKER,
H. H. HAME.

---

Copies of this patent may be obtained for five cents each, by addressing the "Commissioner of Patents, Washington, D. C."